(12) United States Patent
Oh

(10) Patent No.: US 9,210,342 B2
(45) Date of Patent: Dec. 8, 2015

(54) METHOD AND SYSTEM FOR REMOVING NOISE BY CONTROLLING LENS IRIS

(71) Applicant: HANWHA TECHWIN CO.,LTD., Changwon-si (KR)

(72) Inventor: Jae Yoon Oh, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 14/283,711

(22) Filed: May 21, 2014

(65) Prior Publication Data

US 2015/0172571 A1 Jun. 18, 2015

(30) Foreign Application Priority Data

Dec. 13, 2013 (KR) .................. 10-2013-0155637

(51) Int. Cl.
*H04N 5/357* (2011.01)

(52) U.S. Cl.
CPC .................................... *H04N 5/357* (2013.01)

(58) Field of Classification Search
CPC ............... G06T 5/001; G06T 2207/20172; H04N 5/217; H04N 5/357; H04N 9/71
See application file for complete search history.

(56) References Cited

U.S. PATENT DOCUMENTS

| 7,773,133 | B2 | 8/2010 | Jeong et al. |
| 2009/0129674 | A1* | 5/2009 | Lin et al. ........................ 382/173 |
| 2009/0180703 | A1 | 7/2009 | Jang et al. |
| 2011/0038538 | A1* | 2/2011 | Ooishi ........................... 382/164 |
| 2011/0194851 | A1* | 8/2011 | Hjelmstrom .................. 396/242 |
| 2012/0114264 | A1 | 5/2012 | Shmunk et al. |
| 2014/0055639 | A1* | 2/2014 | Fujimoto, Masakatsu 348/229.1 |

FOREIGN PATENT DOCUMENTS

| KR | 1996-0028201 A | 7/1996 |
| KR | 10-2008-0012029 A | 2/2008 |
| KR | 10-2009-0078544 A | 7/2009 |
| KR | 10-2009-0096222 A | 9/2009 |
| KR | 10-2010-0116302 A | 11/2010 |
| KR | 10-1008650 B1 | 1/2011 |
| KR | 10-2012-0073203 A | 7/2012 |

* cited by examiner

*Primary Examiner* — Mekonnen Dagnew
(74) *Attorney, Agent, or Firm* — Sughrue Mion, PLLC (57) ABSTRACT

Provided is a noise-removing system including: an iris controller configured to control a degree of openness of a lens iris; a noise image analyzer configured to perform an analysis of a noise image that is obtained in a state when the iris controller closes the iris; a normal image analyzer configured to analyze a normal image that is obtained in a state when the iris controller opens the iris; and a noise remover configured to remove noise from an image, based on a result of the analysis performed by the noise image analyzer and the analysis performed by the normal image analyzer.

13 Claims, 7 Drawing Sheets

FIG. 7

METHOD AND SYSTEM FOR REMOVING NOISE BY CONTROLLING LENS IRIS

CROSS-REFERENCE TO RELATED APPLICATION

This application claims priority to Korean Patent Application No. 10-2013-0155637, filed on Dec. 13, 2013, in the Korean Intellectual Property Office, the disclosure of which is incorporated herein in its entirety by reference.

BACKGROUND

1. Field

One or more exemplary embodiments of the present disclosure relate to a noise-removing method and system, and more particularly, to a noise-removing method and system for removing a noise element from an image by analyzing an image that is obtained by opening or closing a lens iris.

2. Description of the Related Art

An image monitoring system is a system in which cameras are installed in several locations that need monitoring, so as to perform real-time monitoring and to enable a follow-up search by transmitting images, obtained from the cameras, to a monitor or storing the images in a storage apparatus. In most cases, a monitoring camera, mainly used for an image monitoring system, needs to operate for 24 hours. Accordingly, an image of a certain degree of quality may be generated in a low-illumination environment, such as in a dark location or at night. However, it is highly possible that noise occurs in an image in a low-illumination environment.

Accordingly, techniques for obtaining a monitoring image in which noise is reduced in a low-illumination environment are being developed. Representative methods may include a three-dimensional (3D) filtering method using a structure tensor of an image and a non-local mean-based method.

The 3D filtering method using a structure tensor is a method including the operations of calculating a gradient between neighboring pixels for each pixel of an image, generating a structure tensor based on the gradient, and calculating an eigenvector and an eigenvalue based on the generated structure tensor. Then, based on this calculation, a covariance matrix, a scaling matrix, and a rotation matrix of a 3D Gaussian distribution are calculated, and ultimately, a 3D Gaussian filtering kernel optimized for a corresponding pixel is generated. However, with regard to the 3D filtering method, since a great amount of calculations are required for generating and employing a kernel and noise is not steadily removed, it may be difficult to manufacture a product which uses this method.

The non-local mean-based method employs the concept that a feature in a local area of an image is also found in another area of the image. The non-local mean-based method includes the operations of, with regard to a block of a specific size, searching for blocks similar to the block of a specific size, gathering found blocks, performing noise-removing filtering appropriate for the feature on the found blocks, and then, locating the filtered blocks back to their original location. The non-local mean-based method provides high performance of removing image noise. However, blocks similar to a specific block need to be searched for in an entire image, and a block artifact may occur.

SUMMARY

One or more exemplary embodiments provide a noise-removing method performed by analyzing a mean and a standard deviation of a noise signal by controlling an iris of a monitoring camera lens, generating a noise-removing mask by using a weighted sum of values of the mean and the standard deviation of the noise signal, multiplying an image having noise by the noise-removing mask, and independently controlling an increase or decrease in a signal for each block of the image.

Additional aspects will be set forth in part in the description which follows and, in part, will be apparent from the description, or may be learned by practice of the presented exemplary embodiments.

According to one or more exemplary embodiments, there is provided a noise-removing system including: an iris controller configured to control a degree of openness of a lens iris; a noise image analyzer configured to perform an analysis of a noise image that is obtained in a state when the iris controller closes the iris; a normal image analyzer configured to perform an analysis of a normal image that is obtained in a state when the iris controller normally opens the iris; and a noise remover configured to remove noise from an image, based on a result of the analysis performed by the noise image analyzer and the analysis performed by the normal image analyzer.

The noise-removing system may further include a gain setter configured to set a gain of an image sensor of the noise-removing system.

The noise image analyzer may be configured to divide the noise image into a plurality of blocks, and calculate a block mean and a block standard deviation for each of the plurality of blocks.

The normal image analyzer may be configured to divide the normal image into a plurality of blocks, and calculate a block mean and a block standard deviation for each of the plurality of blocks.

The noise image analyzer and the normal image analyzer may be configured to obtain a result of the analysis of the noise image and the analysis of the normal image, respectively, with respect to a gain setting value for one or more image sensors.

The normal image may be an image that is captured in a low-illumination environment.

The noise remover may be configured to calculate a mean difference Diff_Mean that is a difference between a block mean of the noise image and a block mean of the normal image, calculate a standard deviation difference Diff_Std that is a difference between a block standard deviation of the noise image and a block standard deviation of the normal image, calculate a weighted sum based on the mean difference Diff_Mean and the standard deviation difference Diff_Std, and generate a noise mask Noise_Mask based on the weighted sum.

The noise remover may be configured to obtain an image, from which noise is removed, by multiplying the normal image by the noise mask Noise_Mask.

According to another aspect of an exemplary embodiment, there is provided a noise-removing method including: analyzing a noise image that is obtained in a state when an iris of a camera is closed; analyzing a normal image that is obtained in a state when the iris is open; and removing noise from an image, based on a result of the analyzing of the noise image and the analyzing of the normal image.

The noise-removing method may further include, before the analyzing of the noise image and the analyzing of the normal image, setting a gain for adjusting a gain of an image sensor of the camera.

The analyzing of the noise image may include dividing the noise image into a plurality of blocks, and calculating a block mean and a block standard deviation for each of the plurality of blocks.

The analyzing of the normal image may include dividing the normal image into a plurality of blocks, and calculating a block mean and a block standard deviation for each of the plurality of blocks.

The removing of the noise may include: calculating a mean difference Diff_Mean that is a difference between a block mean of the noise image and a block mean of the normal image; calculating a standard deviation difference Diff_Std that is a difference between a block standard deviation of the noise image and a block standard deviation of the normal image; calculating a weighted sum based on the mean difference Diff_Mean and the standard deviation difference Diff_Std; and generating the noise mask Noise_Mask based on the weighted sum.

The removing of the noise may further include obtaining an image from which noise is removed by multipling the noise mask Noise_Mask by the normal image.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are described below, by referring to the figures, to explain aspects of the present description. As used herein, the term "and/or" includes any and all combinations of one or more of the associated listed items.

In the following detailed description, reference is made to the accompanying drawings that show, by way of illustration, specific exemplary embodiments which may be practiced. These exemplary embodiments are described in sufficient detail to enable those skilled in the art to practice the exemplary embodiments. It is to be understood that the various exemplary embodiments, although different, are not necessarily mutually exclusive. For example, a particular feature, structure, or characteristic described herein, in connection with one exemplary embodiment, may be implemented within other exemplary embodiments without departing from the spirit and scope of the exemplary embodiments. In addition, it is to be understood that a location or arrangement of individual elements within each disclosed exemplary embodiment may be modified without departing from the spirit and scope of the exemplary embodiments. The following detailed description is, therefore, not to be taken in a limiting sense, and the scope of the exemplary embodiments is defined only by the appended claims, appropriately interpreted, along with the full range of equivalents to which the claims are entitled. In the drawings, like numerals refer to the same or similar functionality throughout the several views.

The exemplary embodiments will now be described more fully with reference to the accompanying drawings, in which exemplary embodiments are shown.

Figure 1:
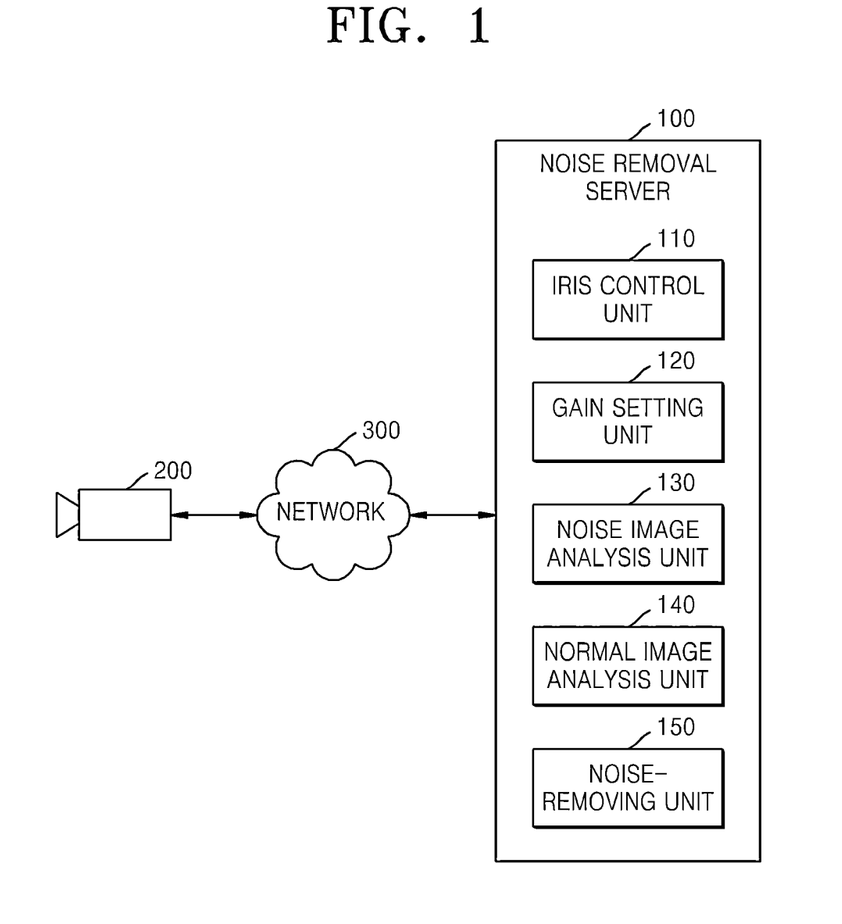
FIG. 1 is a diagram of a configuration of a noise-removing system according to an exemplary embodiment.

FIG. 1 is a diagram of a configuration of a noise-removing system according to an exemplary embodiment.

Referring to FIG. 1, according to an exemplary embodiment, the noise removal system includes a noise removal server 100, a network camera 200, and a network 300.

Referring to FIG. 1, the network camera 200 transceives data with the noise removal server 100 via the network 200. In detail, while communicating with the noise removal server 100 via a communication channel DCOM, the network camera 200 transmits live view video data to the noise removal server 100 via an image data channel DIMA. Instead of a plurality of monitoring cameras, only one monitoring camera may communicate with the noise removal server 100. Alternately, one monitoring camera or a plurality of monitoring cameras may communicate with a plurality of the noise removal servers 100. As such, various modifications may be made.

The network camera 200 may function as a monitoring camera and transmit image data to the noise removal server 100 even in a low-illumination environment. Since a monitoring camera may be required to obtain a 24-hour monitoring image, the monitoring camera may be installed in a low-illumination environment such as at night or in a dark place. If the network camera 200 is installed in a low-illumination environment, noise needs to be removed by transmitting a low-illumination image to the noise removal server 100.

Additionally, internal settings of the network camera 200 may be changed by using the noise removal server 100. Internal settings of a camera refer to internal settings that may affect an image captured by a camera, for example, an aperture number of a camera lens iris or a gain of an image sensor.

The network 300 constituting the communication channel DCOM and the image data channel DIMA may be any element that may transceive data or a command, in a wired fashion or wirelessly. For example, the network 300 may connect the network camera 200 to the noise removal server 100 in a wired fashion, e.g., via a cable. Alternately, the network 300 may wirelessly connect the network camera 200 to the noise removal server 100 by using a wireless local area network (LAN) or other networks (e.g., the Internet).

A general computing apparatus or a server apparatus may be implemented as the noise removal server 100. For example, a control system for a monitoring camera may be employed as the noise removal server 100. The noise removal server 100 may store a real-time moving image that is transmitted from the network camera 200 as necessary.

The noise removal server 100 removes noise from an image obtained from the network camera 200. Particularly, if an image obtained from the network camera 200 is a low-illumination image, the noise removal server 100 may provide high performance in removing noise.

Generally, a low-illumination image contains heavier noise than an image obtained in a normal environment, due to problems which are associated with a camera. Additionally, since brightness is low in a low-illumination image, it is difficult to identify a subject. Thus, a user may feel that noise is heavier in a low-illumination image than in an image in a normal environment. An image ni(t) obtained from the network camera 200 may be expressed as [Equation 1] shown below.

$$ni(t)=i(t)+n(t) \quad \text{[Equation 1]}$$

where t represents a current frame, i(t) represents a noise-removing image of the current frame to which noise is not added, that is, an image in which noise is removed, n(t) represents a noise image of the current frame, and ni(t) represents a normal image of the current frame which is obtained from the network camera 200 and to which noise is added.

According to an exemplary embodiment, the noise-removing system obtains a noise image in a state when a lens iris is fully closed, obtains a normal image in a state when a lens iris is normally open, and obtains the original image i(t), from which the noise in the noise image n(t) is removed, by comparing values that are obtained by analyzing the noise image and the normal image.

Referring to FIG. 1, the noise removal server 100 includes an iris control unit 110 (e.g., "iris controller"), a gain setting unit 120 (e.g., "gain setter"), a noise image analysis unit 130 (e.g., "noise analyzer"), a normal image analysis unit 140 (e.g., "normal image analyzer"), and a noise-removing unit 150 (e.g., "noise remover").

Figure 2:
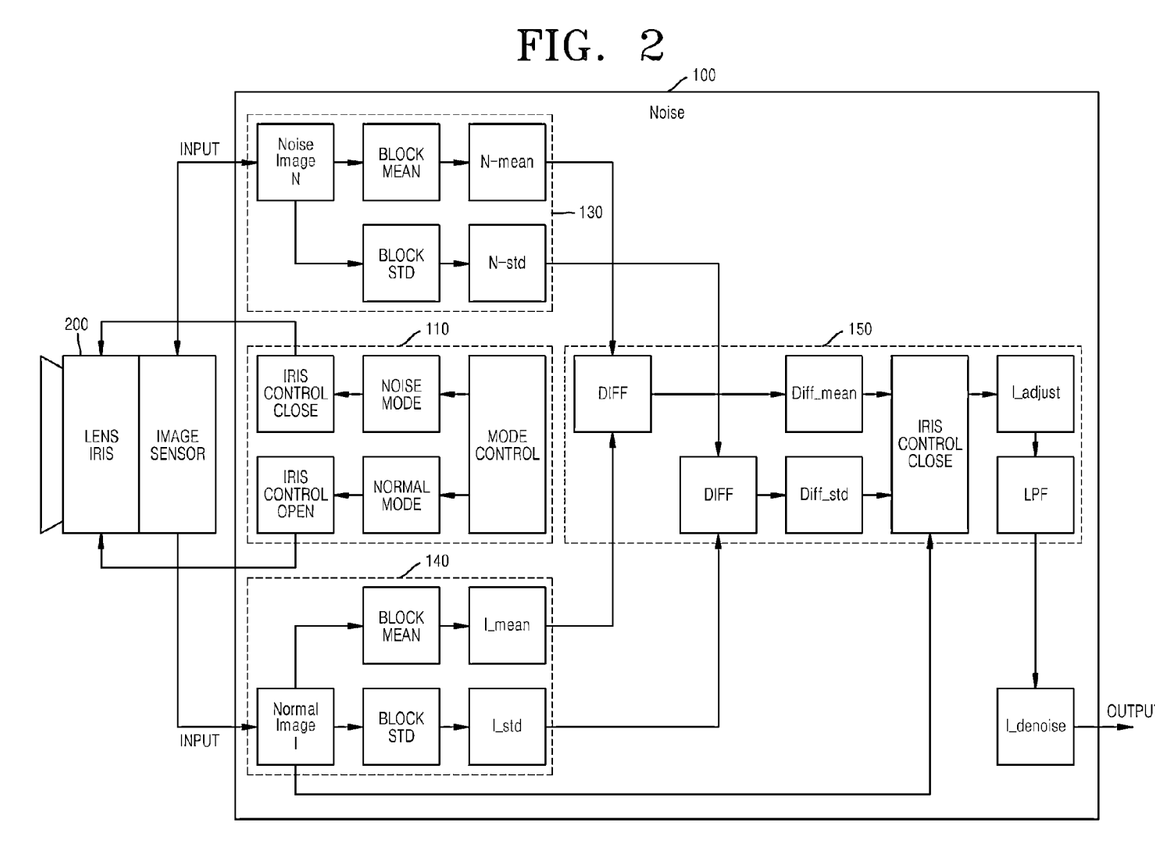
FIG. 2 is a block diagram of a noise-removing method according to an exemplary embodiment.

FIG. 2 is a block diagram of a noise-removing method according to an exemplary embodiment.

Hereinafter, referring to FIGS. 1 and 2, a noise-removing method according to an exemplary embodiment will be described.

The iris control unit 110, shown in FIGS. 1 and 2, determines a degree of openness of a lens iris 210 by controlling the lens iris 210. In detail, the iris control unit 110 determines whether to set a degree of openness of the lens iris 210 of the network camera 200 to a normal mode or a noise mode, by using a mode control function. If the iris control unit 110 controls the lens iris 210 in the noise mode, the iris control unit 110 generates and transmits a lens iris close signal IRIS CONTROL CLOSE to the lens iris 210. Alternately, if the iris control unit 110 controls the lens iris 210 in the normal mode, the iris control unit 110 generates and transmits an iris opening signal IRIS CONTROL OPEN to the lens iris 210. The iris opening signal IRIS CONTROL OPEN controls to fully open the lens iris 210 or to open the lens iris 210 to a normal open state.

A degree of openness of the lens iris 210 in the network camera 200 is controlled according to a signal received from the iris control unit 110. In other words, if the network camera 200 receives the iris close signal IRIS CONTROL CLOSE, the network camera 200 closes the lens iris 210. If the network camera 200 receives the iris opening signal IRIS CONTROL OPEN, the network camera 200 opens the lens iris 210.

Then, the gain setting unit 120, shown in FIG. 1, controls a gain of an image sensor 220. The image sensor 220 is an image detection device that is mounted in a camera, and detects information about a subject and converts the detected information into an electrical image signal. According to an exemplary embodiment, a commonly used image sensor such as a charge-coupled device (CCD) or complementary metal-oxide semiconductor (CMOS) image sensor may be implemented as the image sensor 220.

The noise image analysis unit 130, shown in FIG. 1, analyzes a noise image that is obtained in a state when the iris control unit 110 has closed the lens iris 210. In detail, referring to FIG. 2, the noise image analysis unit 130 obtains a noise image N, which is obtained in a state when the lens iris 210 is closed, from the image sensor 220, and divides the noise image N into a plurality of blocks. Then, the noise image analysis unit 130 calculates a block mean BLOCK MEAN for each block, and generates a noise mean image N_mean based on the calculated block mean BLOCK MEAN. Then, the noise image analysis unit 130 calculates a block standard deviation BLOCK STD for each block, and generates a noise standard deviation image N_std based on the block standard deviation BLOCK STD.

If the noise image analysis unit 130 divides an image into a M×N blocks, the noise mean image N-mean may be expressed as Block_Mean(n(t)) and the noise standard deviation image N-std may be expressed as BLock_Std(n(t)). Block_Mean is an operation for calculating a mean with respect to an M×N block, and Block_Std is an operation for calculating a standard deviation with respect to an M×N block.

Figure 3:
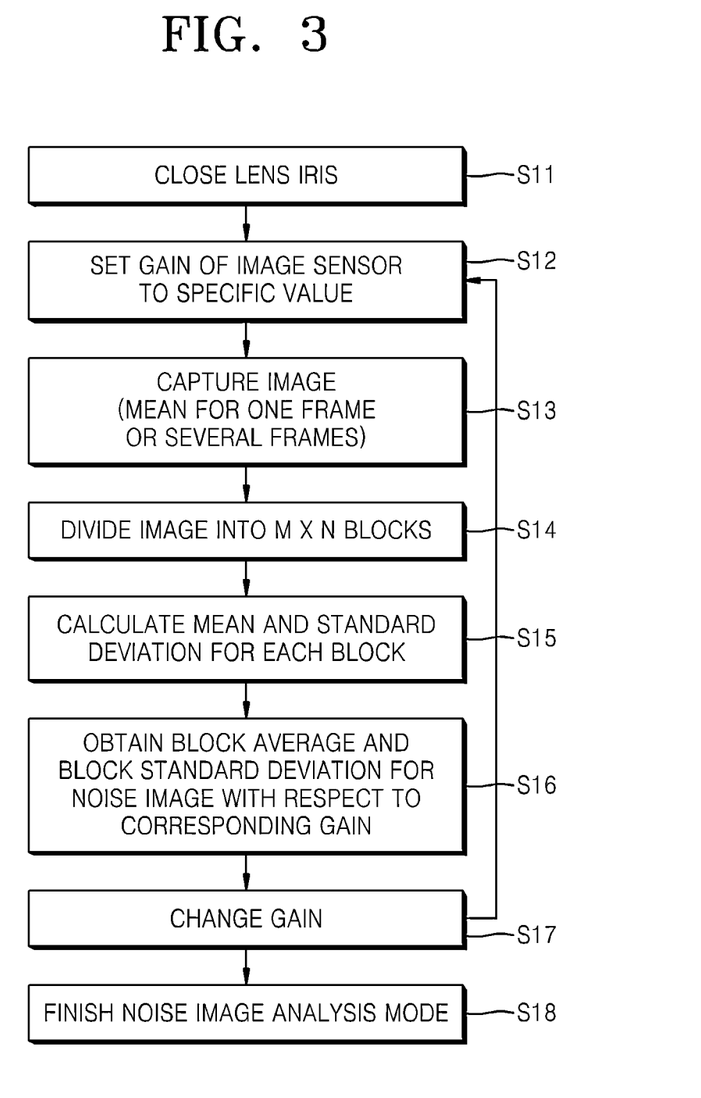
FIG. 3 is a diagram illustrating a process of analyzing a noise image according to an exemplary embodiment.

FIG. 3 is a diagram illustrating a process of analyzing a noise image according to an exemplary embodiment.

In operation S11, the iris control unit 110 transmits a signal IRIS CONTROL CLOSE for controlling to close the lens iris 210.

Then, in operation S12, the gain setting unit 120 sets a gain of the image sensor 220 to a specific value.

Then, an image, which is captured for one frame or several frames in operation S13, is obtained from the network camera 200. Then, in operation S14, the obtained image is divided into M×N blocks.

In operation S15, a mean and a standard deviation for each block, obtained by the dividing of the image, are calculated. In operation S16, a noise mean image and a noise standard deviation image are obtained for each block with respect to the specific gain that was set in operation S12.

In operation S17, the gain setting unit 120 changes the gain. Then, in operations S12 through S16, the gain setting unit 120 re-obtains a noise mean image and a noise standard deviation image for each block with respect to the changed gain.

In operation S18, when a noise mean image and a noise standard deviation image for each block are obtained with respect to set various gains, an image analysis mode is finished.

Then, the normal image analysis unit 140, shown in FIG. 1, analyzes a normal image that is obtained in a state when the iris control unit 110 normally opens the lens iris 210. In detail, referring back to FIG. 2, the normal image analysis unit 140 obtains a normal image I, which is obtained in a state when the lens iris 210 is open, from the image sensor 220, and divides the noise image I into a plurality of blocks. Then, the noise image analysis unit 130 calculates a block mean BLOCK MEAN for each block, and generates a normal mean image I_mean based on the calculated block mean BLOCK MEAN. Then, the noise image analysis unit 130 calculates a block standard deviation BLOCK STD for each block, and generates a noise standard deviation image I_std based on the calculated block standard deviation BLOCK STD.

If the normal image analysis unit 140 divides an image into M×N blocks, the normal mean image I_mean may be represented as Block_Mean(n(t)), and the normal standard deviation image I_std may be represented as BLock_Std(n(t)).

Figure 4:
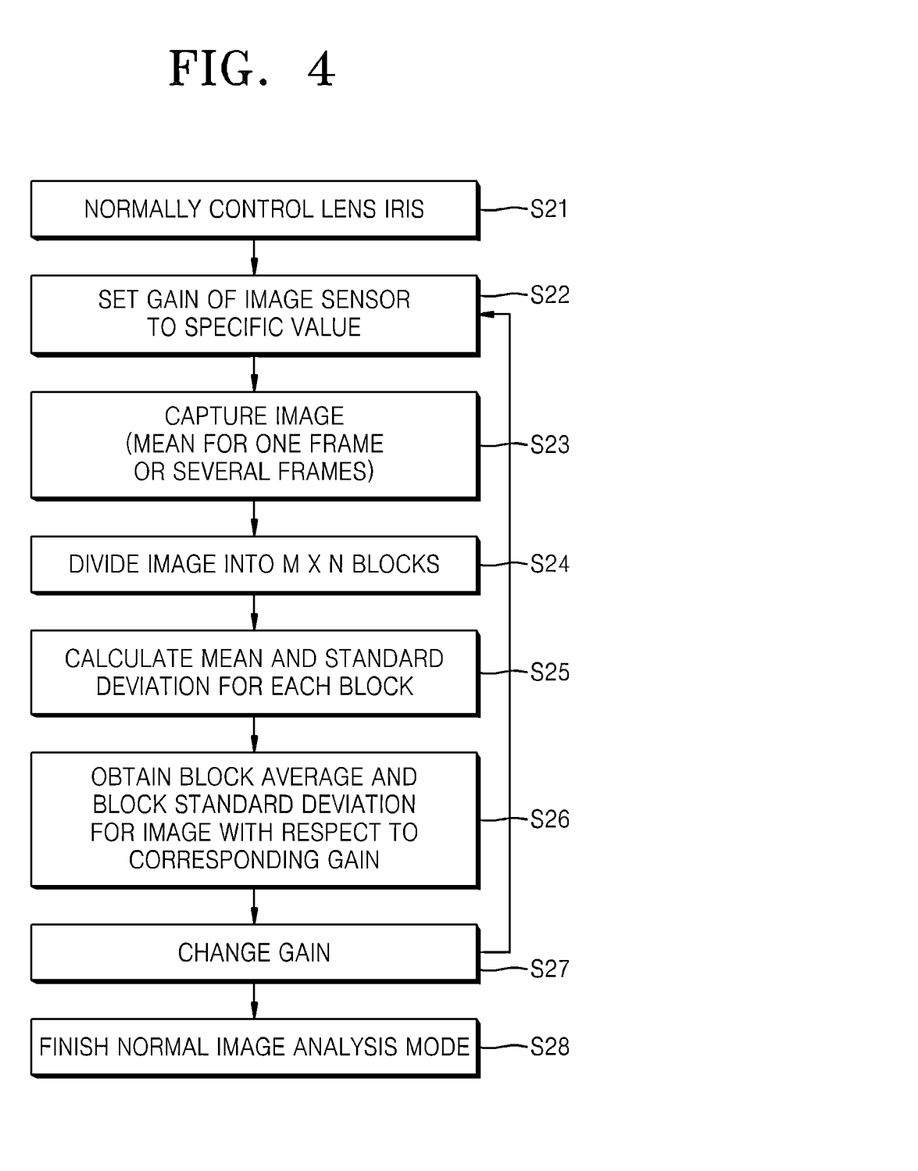
FIG. 4 is a diagram illustrating a process of analyzing a normal image according to an exemplary embodiment.

FIG. 4 is a diagram illustrating a process of analyzing a normal image according to an exemplary embodiment.

In operation S21, the iris control unit 110 transmits a signal IRIS CONTROL OPEN for controlling to open the lens iris 210, thus normally controlling the lens iris 210.

Then, in operation S22, the gain setting unit 120 sets a gain of the image sensor 220 to a specific value.

Then, an image, which is captured for one frame or several frames in operation S23, is obtained from the network camera 200. Then, in operation S24, the obtained image is divided into M×N blocks.

In operation S25, a mean and a standard deviation for each block, obtained by the dividing of the image, are calculated. In operation S26, a normal mean image and a normal standard deviation image are obtained for each block with respect to the specific gain that was set in operation S12.

In operation S27, the gain setting unit 120 changes the gain. Then, in operations S22 through S26, the gain setting unit 120 re-obtains a normal mean image and a normal standard deviation image for each block with respect to the changed gain.

In operation S28, when a normal mean image and a normal standard deviation image for each block are obtained with respect to set various gains, a normal image analysis mode is finished.

According to an exemplary embodiment, whenever the gain setting unit 120 sets a gain of the image sensor 220, the noise image analysis unit 130 and the normal image analysis unit 140 may analyze a noise image and a normal image with respect to each gain.

Then, the noise-removing unit 150 removes noise in the image, based on a result of the analyzing performed by the noise image analysis unit 130 and the normal image analysis unit 140.

If the noise image analysis unit 130 and the normal image analysis unit 140 divide the entire image into M×N blocks, it may be assumed that a relation between a mean and a standard deviation for each block is established as expressed in [Equation 2] and [Equation 3] shown below.

$$\text{Block\_Mean}(ni(t)) = \text{Block\_Mean}(i(t)) + \text{Block\_Mean}(n(t)) \quad \text{[Equation 2]}$$

$$\text{Block\_Std}(ni(t)) = \text{Block\_Std}(i(t)) + \text{Block\_Std}(n(t)) \quad \text{[Equation 3]}$$

From [Equation 2] and [Equation 3], a block mean and a block standard deviation for an original image i(t), to which noise is not included, may be calculated as expressed in [Equation 4] and [Equation 5] shown below.

$$\text{Block\_Mean}(i(t)) = \text{Block\_Mean}(ni(t)) - \text{Block\_Mean}(n(t)) \quad \text{[Equation 4]}$$

$$\text{Block\_Std}(i(t)) = \text{Block\_Std}(ni(t)) - \text{Block\_Std}(n(t)) \quad \text{[Equation 5]}$$

Referring to [Equation 4] and [Equation 5], it may be understood that the original image i(t) that does not include noise may be recovered by calculating a block mean and a block standard deviation respectively for an image ni(t) that includes noise and a noise image n(t) that includes only noise, and obtaining a difference therebetween. Thus, according to an exemplary embodiment, the noise-removing unit 150 respectively subtracts the block mean and the block standard deviation for the image n(t) that includes noise only, from the block mean and the block standard deviation for the image ni(t) that includes noise, and based on a result of the subtracting, outputs the original image i(t).

Referring back to FIG. 2, if a difference between a block mean of the noise image n(t) and a block mean of the normal image ni(t) that includes noise is defined as a mean difference Diff_Mean, the mean difference Diff_Mean may be expressed by using Equation 6 shown below. In other words, as shown in FIG. 2, an image of a mean difference Diff_Mean that is a difference between block means may be generated by using a subtraction operation DIFF.

$$\text{Diff\_Mean} = \text{abs}(\text{Block\_Mean}(ni(t)) - \text{Block\_Mean}(n(t))) \quad \text{[Equation 6]}$$

Likewise, if a difference between a block standard deviation of the noise image n(t) and a block standard deviation of the normal image ni(t) with noise added is defined as a standard deviation difference Diff_Std, the standard deviation difference Diff_Std may be expressed as [Equation 7] shown below. In other words, as shown in FIG. 2, an image of the standard deviation difference Diff_Std that is a difference between block standard deviations may be generated by using a subtraction operation DIFF.

$$\text{Diff\_Std} = \text{abs}(\text{Block\_Std}(ni(t)) - \text{Block\_Std}(n(t))) \quad \text{[Equation 7]}$$

The noise-removing unit 150 performs a weighted sum calculating operation ADJUSTED WEIGHTED SUM, based on a mean difference Diff_Mean and a standard deviation difference Diff_Std obtained from [Equation 6] and [Equation 7]. A result obtained from a weighted sum is used to generate a noise mask Noise_Mask for removing noise as shown in [Equation 8]. In [Equation 8] shown below, a and b are arbitrary constants, and the noise mask Noise_Mask may be represented as a total of a weighted sum of a mean difference Diff_Mean and a standard deviation difference Diff_Std and a constant c.

$$\begin{aligned}\text{Noise\_Mask} &= (a + \text{Diff\_Mean}) * (b + \text{Diff\_Std}) \quad \text{[Equation 8]}\\ &= (a * \text{Diff\_Std}) + (b * \text{Diff\_Mean}) + \\ &\quad (\text{Diff\_Mean} * \text{Diff\_Std}) + (a * b)\\ &= (a * \text{Diff\_Std}) + (b * \text{Diff\_Mean}) + (c)\end{aligned}$$

The noise-removing unit 150 calculates an original image i(t)(I_adjust) in which noise is removed, by multiplying the noise mask Noise_Mask, shown in Equation 8, by an image ni(t) that includes noise.

$$i(t) = ni(t) * \text{Noise\_Mask} = ni(t) * (a + \text{Diff\_Mean}) * (b + \text{Diff\_Std}) \quad \text{[Equation 9]}$$

Additionally, the noise-removing unit 150 may generate an image dnI(t) (I_denoise) in which high-frequency noise is removed, by applying a low-pass filter (LPF) to a noise-removed original image i(t) as expressed in [Equation 10] shown below.

$$dnI(t) = \text{LPF}(i(t)) \quad \text{[Equation 10]}$$

Figure 5:
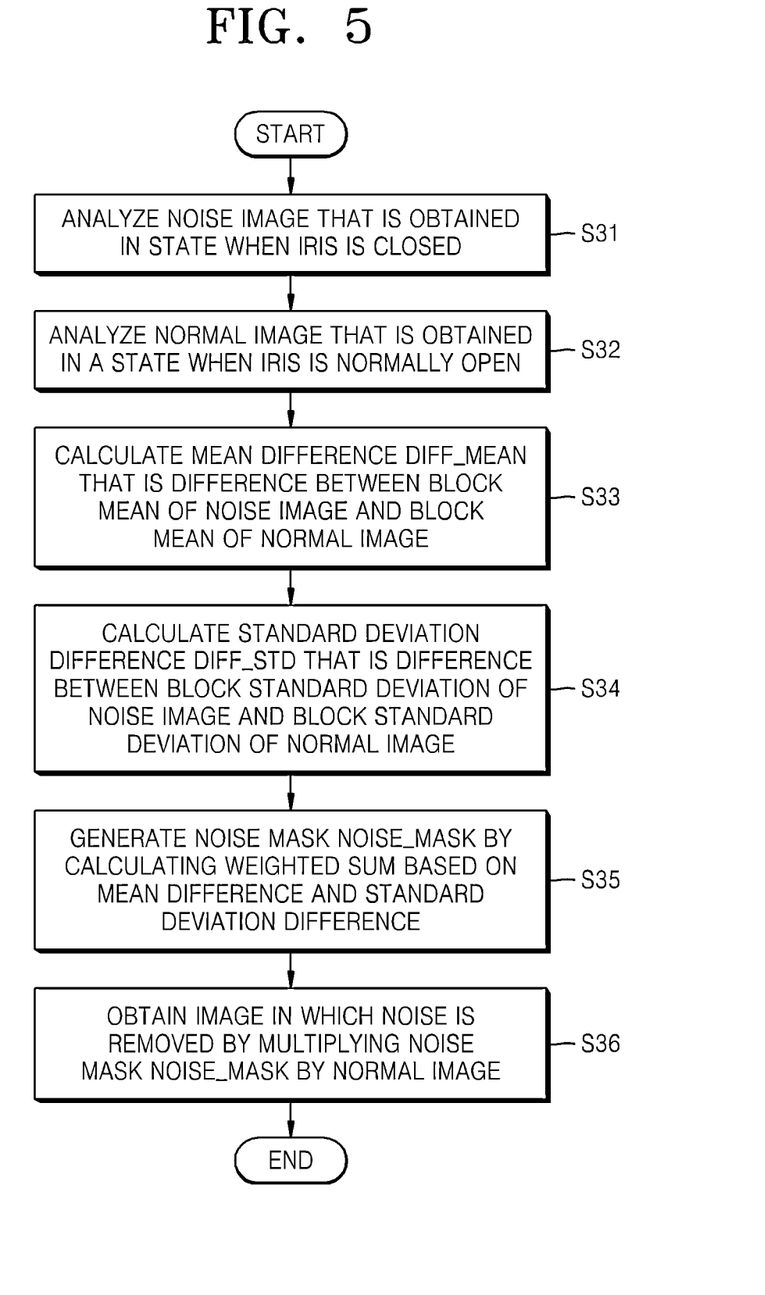
FIG. 5 is a flowchart of the noise removal method according to an exemplary embodiment.

FIG. 5 is a flowchart of the noise-removing method according to an exemplary embodiment.

In operation S31, a noise image that is obtained in a state when an iris is closed is analyzed. A detailed explanation with respect to operation S31 is described above with respect to the flowchart shown in FIG. 3.

In operation S32, a normal image that is obtained in a state when the iris is normally opened is analyzed. A detailed explanation with respect to operation S32 is described above with respect to the flowchart shown in FIG. 4.

Then, in operation S33, a mean difference Diff_Mean that is a difference between a block mean of the noise image and a block mean of the normal image is calculated.

In operation S34, a standard deviation difference Diff_Std that is a difference between a block standard deviation of the noise image and a block standard deviation of the normal image is calculated.

In operation S35, a weighted sum is calculated based on the mean difference and the standard deviation difference, and a noise mask Noise_Mask is generated based on the weighted sum.

In operation S36, an image in which noise is removed is obtained by multiplying the noise mask Noise_Mask by the normal image.

Figure 6:
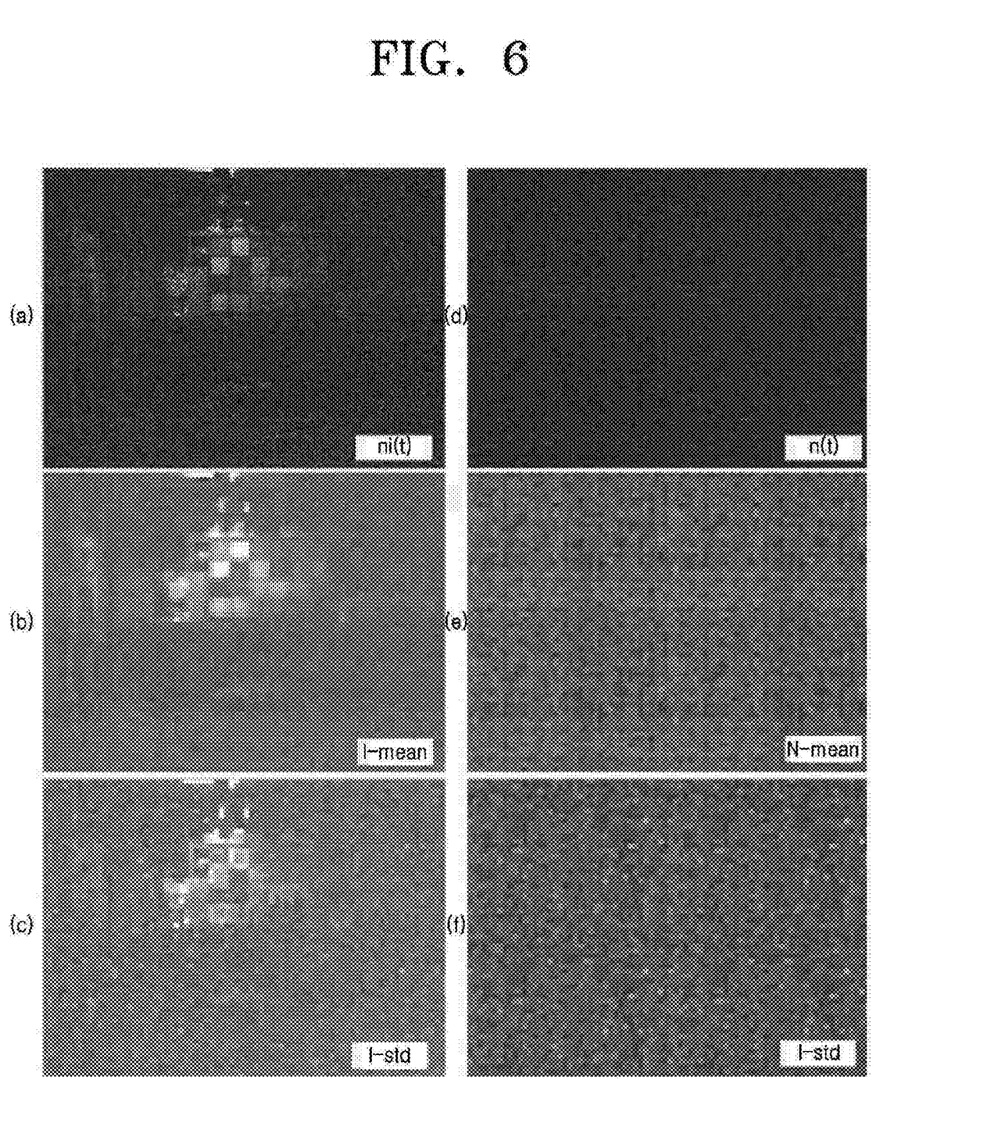
FIGS. 6 and 7 show images to which the noise-removing method is actually applied, according to an exemplary embodiment.
Figure 7:
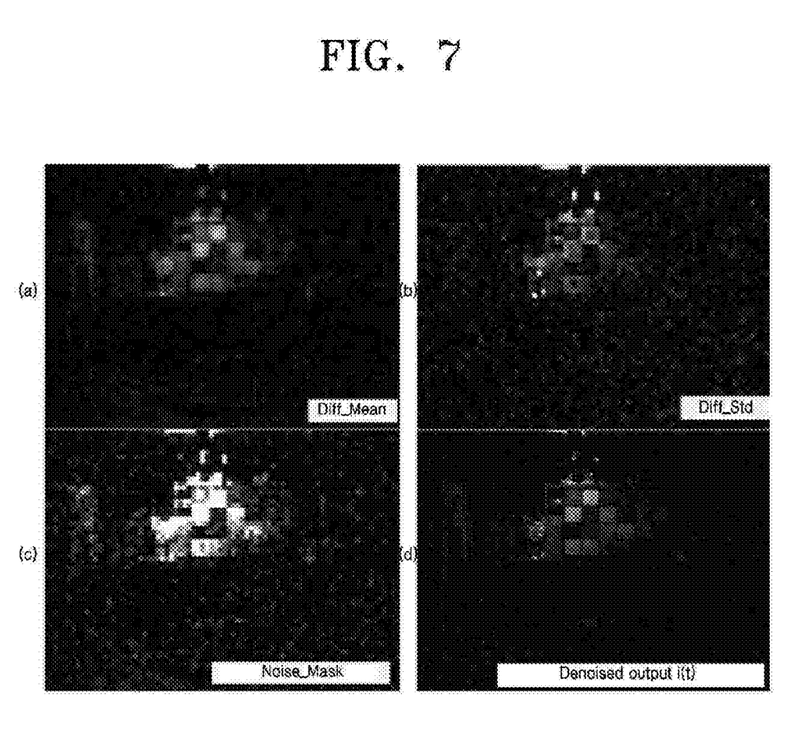

FIGS. 6 and 7 show images to which the noise-removing method according to an exemplary embodiment is actually applie.

The image shown in (a) of FIG. 6 is an input image to which noise is added in an actual low-illumination environment, and is a normal image ni(t) that is obtained in a state when a lens iris is normally open. The image shown in (b) of FIG. 6 is a normal mean image I_mean that is a block mean of the normal image. The image shown in (c) of FIG. 6 is a standard deviation image I_std that is a normal block standard deviation of the normal image.

Additionally, the image shown in (d) of FIG. 6 is an image in which only noise is present. The image shown in (d) of FIG. 6 is a noise image n(t) which is obtained when a lens iris is open. The image shown in (e) of FIG. 6 is a noise mean image N_mean that is a block mean of the noise image. The image shown in (f) of FIG. 6 is a noise standard deviation image N-std that is a block standard deviation of the noise image.

The image shown in (a) of FIG. 7 is an image of a mean difference Diff_Mean that is a difference between a block mean of the noise image n(t) and a block mean of the normal image ni(t), captured by camera 200. The image shown in (b) of FIG. 7 is a standard deviation image Diff_Std that is a difference between a block standard deviation of the noise image and a block standard deviation of the normal image.

The image shown in (c) of FIG. 7 represents a noise mask image Noise_Mask that is obtained based on a weighted sum of the mean difference and the standard deviation difference. The image shown in (d) of FIG. 7 is an image i(t) in which noise is removed, which is obtained by multiplying the noise mask Noise_Mask by the normal image ni(t).

The exemplary embodiments relate to an image noise-removing system employing lens iris control. Conventional noise-removing methods require such a great amount of operations that it may be difficult to configure an embedded system. Additionally, the conventional noise-removing methods have problems such as a problem of equalization and block artifacts. On the contrary, according to the exemplary embodiments, the noise-removing method is performed by analyzing a mean and a standard deviation of a noise signal by controlling an iris of a monitoring camera lens, generating a noise-removing mask by using a weighted sum of values of the mean and the standard deviation of the noise signal, multiplying an image having noise by the noise-removing mask, and thus, independently controlling an increase or a decrease in a signal for each block of the image.

According to an exemplary embodiment, the noise-removing method enables a system to adaptively remove noise from a low-illumination image under various conditions. Thus, a low-illumination image quality of a monitoring camera may be improved, and operations may be simplified.

As described above, according to the one or more exemplary embodiments, provided is a noise-removing method, in which noise may be adaptively removed from a low-illumination image under various conditions, and thus, a low-illumination image quality of a monitoring camera may be improved, and operations may be simplified.

In addition, other exemplary embodiments may also be implemented through computer readable code or instructions in or on a medium, e.g., a computer readable medium, to control at least one processing element to implement any above described exemplary embodiment. The medium may correspond to any medium/media permitting the storage and/or transmission of the computer readable code.

The computer readable code may be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure, including or carrying a signal or information, such as a device carrying a bitstream according to one or more exemplary embodiments. The media may also be a distributed network, so that the computer readable code is stored or transferred and executed in a distributed fashion. Furthermore, the processing element could include a processor or a computer processor, and processing elements may be distributed and/or included in a single device. Program commands include not only a machine language code made by a compiler but also a high level code that may be used by an interpreter, etc., which is executed by a computer. In order to perform processing in the exemplary embodiments, hardware devices may be changed to one or more software modules, or vice versa.

The particular implementations shown and described herein are illustrative examples of the exemplary embodiments and are not intended to otherwise limit the scope of the exemplary embodiments in any way. For the sake of brevity, conventional electronics, control systems, software development and other functional aspects of the systems (and components of the individual operating components of the systems) may not be described in detail. Furthermore, the connecting lines or connectors shown in the various figures are intended to represent exemplary functional relationships and/or physical or logical couplings between the various elements. It should be noted that many alternative or additional functional relationships, physical connections or logical connections may be present in a practical device. Moreover, no item or component is essential to the practice of the exemplary embodiments unless the element is specifically described as "essential" or "critical".

The use of the terms "a" and "an" and "the" and similar referents in the context of describing the exemplary embodiments (especially in the context of the following claims) are to be construed to cover both the singular and the plural. Furthermore, recitation of ranges of values herein are merely intended to function as a shorthand method of referring individually to each separate value falling within the range, unless otherwise indicated herein, and each separate value is incorporated into the specification as if it were individually recited herein. Finally, the operations of all methods described herein may be performed in any suitable order unless otherwise indicated herein or otherwise clearly contradicted by context. The use of any and all examples, or exemplary language (e.g., "such as") provided herein, is intended merely to better illuminate the exemplary embodiments and does not pose a limitation on the scope of the exemplary embodiments unless otherwise claimed. Additionally, it will be understood by those of ordinary skill in the art that various modifications, combinations, and changes may be formed according to design conditions and factors within the scope of the attached claims or the equivalents.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the exemplary embodiments as defined by the following claims.

What is claimed is:

1. A noise-removing system comprising:
an iris controller configured to control a degree of openness of a lens iris;
a noise image analyzer configured to perform an analysis of a noise image that is obtained in a state when the iris controller closes the iris and obtain a mean and a standard deviation of the noise image based on the analysis of the noise image;
a normal image analyzer configured to perform an analysis of a normal image that is obtained in a state when the iris controller opens the iris and obtain a mean and a standard deviation of the normal image based on the analysis of the normal image; and
a noise remover configured to calculate a mean difference that is a difference between the mean of the noise image and the mean of the normal image, calculate a standard deviation difference that is a difference between the standard deviation of the noise image and the standard deviation of the normal image, calculate a weighted sum based on the mean difference and the standard deviation difference generate a noise mask based on the weighted sum, and obtain an image, from which noise is removed, by multiplying the normal image by the noise mask.

2. The noise-removing system of claim 1, further comprising a gain setter configured to set a gain of an image sensor of the noise-removing system.

3. The noise-removing system of claim 1, wherein the noise image analyzer is configured to divide the noise image into a plurality of blocks, and calculate a block mean and a block standard deviation for each of the plurality of blocks.

4. The noise-removing system of claim 1, wherein the normal image analyzer is configured to divide the normal image into a plurality of blocks, and calculate a block mean and a block standard deviation for each of the plurality of blocks.

5. The noise-removing system of claim 1, wherein the noise image analyzer and the normal image analyzer are configured to obtain a result of the analysis of the noise image and the analysis of the normal image, respectively, with respect to a gain setting value for one or more image sensors.

6. The noise-removing system of claim 1, wherein the normal image is an image that is captured in a low-illumination environment.

7. A noise-removing method comprising:
analyzing a noise image that is obtained in a state when an iris of a camera is closed and obtaining a mean and a standard deviation of the noise image based on the analyzing of the noise image;
analyzing a normal image that is obtained in a state when the iris is open and obtaining a mean and a standard deviation of the normal image based on the analyzing of the normal image; and
removing noise from an image by:
calculating a mean difference that is a difference between the mean of the noise image and the mean of the normal image;
calculating a standard deviation difference that is a difference between the standard deviation of the noise image and the standard deviation of the normal image;
calculating a weighted sum based on the mean difference and the standard deviation difference;
generating a noise mask based on the weighted sum, and obtaining an image from which noise is removed by multiplying the noise mask by the normal image.

8. The noise-removing method of claim 7, further comprising, before the analyzing of the noise image and the analyzing of the normal image, setting a gain for adjusting a gain of an image sensor of the camera.

9. The noise-removing method of claim 7, wherein the analyzing of the noise image comprises dividing the noise image into a plurality of blocks, and calculating a block mean and a block standard deviation for each of the plurality of blocks.

10. The noise-removing method of claim 7, wherein the analyzing of the normal image comprises dividing the normal image into a plurality of blocks, and calculating a block mean and a block standard deviation for each of the plurality of blocks.

11. A method to remove noise from an image, comprising:
analyzing a noise image by:
closing a lens iris of a camera, and
analyzing a plurality of images obtained at a corresponding plurality of gains of an image sensor of the camera, while the lens iris is closed, to thereby generate a noise image analysis result including a mean and a standard deviation of the noise image;
analyzing a normal image by:
opening the lens iris of the camera, and
analyzing a plurality of images obtained at a corresponding plurality of gains of the image sensor of the camera, while the lens iris is open, to thereby generate a normal image analysis result including a mean and a standard deviation of the normal image; and
removing the noise from the image by:
calculating a mean difference that is a difference between the mean of the noise image and the mean of the normal image;
calculating a standard deviation difference that is a difference between the standard deviation of the noise image and the standard deviation of the normal image;
calculating a weighted sum based on the mean difference and the standard deviation difference;
generating a noise mask based on the weighted sum; and
obtaining an image from which noise is removed by multiplying the noise mask by the normal image.

12. The method of claim 11, wherein the plurality of gains used during the analyzing of the noise image are the same as the plurality of gains used during the analyzing of the normal image.

13. The method of claim 12, wherein the analyzing of the noise image and the analyzing of the normal image are performed simultaneously with respect to each gain.

* * * * *